United States Patent
Gazzard

(10) Patent No.: US 7,155,221 B1
(45) Date of Patent: Dec. 26, 2006

(54) SYSTEM AND METHOD FOR WIRELESS CALL HANDOVER FROM A SHARED NETWORK TO A HOME NETWORK

(75) Inventor: Daryl Gazzard, Alpharetta, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 357 days.

(21) Appl. No.: 10/786,132

(22) Filed: Feb. 26, 2004

(51) Int. Cl.
*H04Q 7/20* (2006.01)

(52) U.S. Cl. .................... 455/433; 455/436; 455/439; 455/445; 370/331

(58) Field of Classification Search ............ 455/432.1, 455/435.1, 435.2, 433–434, 436–444, 515, 455/525; 370/328, 525, 331, 335, 342
See application file for complete search history.

(56) References Cited

U.S. PATENT DOCUMENTS

| | | | | |
|---|---|---|---|---|
| 2001/0031636 | A1* | 10/2001 | Hanson | 455/432 |
| 2002/0105927 | A1* | 8/2002 | Holma et al. | 370/331 |
| 2002/0151304 | A1* | 10/2002 | Hogan | 455/436 |
| 2004/0029587 | A1* | 2/2004 | Hulkkonen et al. | 455/436 |
| 2004/0058692 | A1* | 3/2004 | Kall et al. | 455/433 |
| 2004/0203761 | A1* | 10/2004 | Baba et al. | 455/433 |
| 2004/0224680 | A1* | 11/2004 | Jiang | 455/433 |
| 2005/0020259 | A1* | 1/2005 | Herrero | 455/433 |
| 2005/0064889 | A1* | 3/2005 | Haumont | 455/514 |
| 2005/0202828 | A1* | 9/2005 | Pecen et al. | 455/453 |

* cited by examiner

*Primary Examiner*—Joseph Feild
*Assistant Examiner*—Kamran Afshar
(74) *Attorney, Agent, or Firm*—Paul, Hastings, Janofsky & Walker LLP

(57) ABSTRACT

A method and system for differential handover of a call into a home mobile network from a partner mobile network is disclosed. An exemplary embodiment of a method for differential call handover includes setting a flag in the partner mobile network which identifies a mobile station, whose communication is being handled by the partner network, as a subscriber to the home network. In an exemplary embodiment, channel information associated with possible handover cells of the home network is retrieved by the partner network after the latter receives a communication from the mobile station indicating a handover condition.

12 Claims, 12 Drawing Sheets

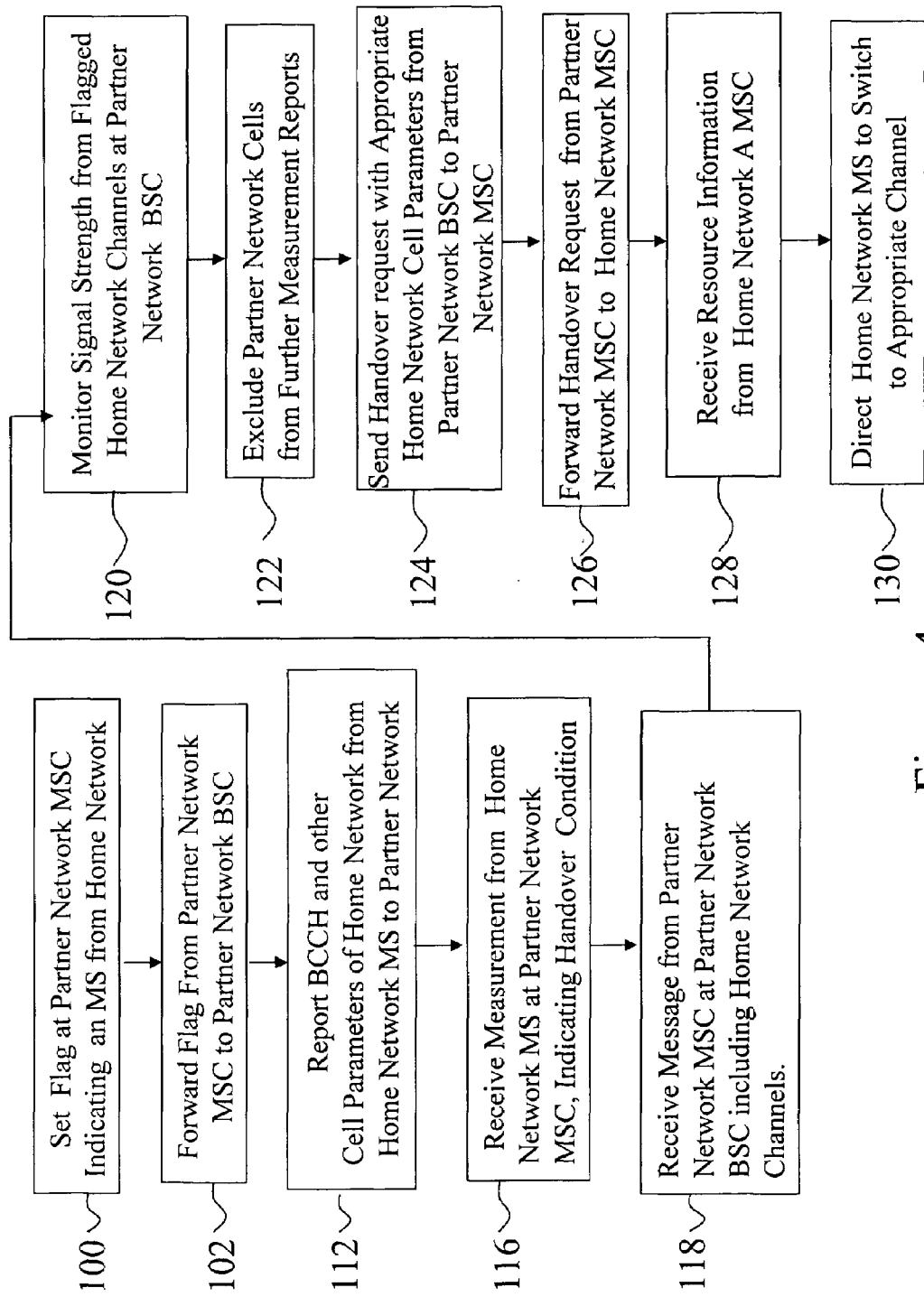

SYSTEM AND METHOD FOR WIRELESS CALL HANDOVER FROM A SHARED NETWORK TO A HOME NETWORK

BACKGROUND

1. Field of the Invention

The present invention relates generally to wireless communications. More specifically, the present invention relates to managing communication links to a wireless device during movement of the device between locations that are served by different network service providers.

2. Background of the Invention

Global system for mobile communication (GSM), one of the most widely used wireless access systems in today's market, employs so-called "cell" technology. Each cell contains a base transceiver station (BTS) to receive and broadcast radio frequency signals to the wireless communication device, such as a cell phone, personal digital assistant (PDA), or computer, all of which may be referred to as a mobile station (MS). In many geographic areas, particularly cities and metropolitan areas, more than one service provider of cellular communications may operate, each operating its own BTS, and base station controller (BSC), the latter often responsible for managing several BTS sites. Under normal conditions, a Mobile Switching Center (MSC) belonging to a customer's (subscriber's) operator is alerted to the location of the MS when the device is powered on. When a subscriber places a call within a region where her or his service provider operates (home region), the call is routed through the provider's network, which is sometimes referred to as a home public land mobile network, or HPLMN. The call is thus routed to the nearest BTS in the HPLMN, even if a BTS from another service provider is available. Thus, all the revenues associated with the call are realized by the subscriber's service provider.

However, there are many geographical areas where a typical service provider may not have a license to operate over the necessary frequency spectrum, or where it would be unduly expensive to deploy network resources, in light of the volume of calls generated. This situation might apply, for example, along major interstate freeways or in very rural areas, among others. In such areas, a service provider will often enter into a sharing agreement with another provider (partner) to receive access to coverage of the area for its customers. The shared network area (hereafter termed "partner region") is designated as belonging to the partner and calls operating in the area are routed through the partner's network. In GSM, if a subscriber moves from an HPLMN into a partner region, GSM has the mechanisms in place to hand the call into the partner network.

As illustrated in FIG. 1, as MS 2, belonging to a subscriber to a home network, travels through home region 4, including cells 6 and 8, the call is directed to and from a BTS in cell 6, which is operated by the home network. During travel, MS 2 continues to monitor the frequencies of channels associated with nearby cells, to determine the signal strength of nearby BTS units (hereafter simply referred to as "cells"). This information is transmitted to the BSC (not shown), which instructs the MS to hand the call into a second cell 10, based on the cell signal strength, and other factors related to management of call traffic. As MS 2 continues to travel to the border of home region 4, the MS will monitor the signal strength of nearby cell 16. Because there are no nearby cells of the home network, a handoff will occur into cell 16 of partner region 14 if MS 2 continues to travel in the same direction. Also, if MS 2 is located in partner region 14 operated by the partner network, a new incoming call is automatically routed to the subscriber MS 2, through cell 16 of the partner network.

When MS 2 moves back to the border of a home region 20, there is no general mechanism to route the call back to the home network without creating artificial boundaries (i.e. MSC borders). In FIG. 1, home region 20 contains cells 22 and 24 belonging to the home and partner networks, respectively. Upon reaching a region between cells 16 and 20, MS 2 continues to send information regarding nearby cells to the BSC of the partner network, which instructs the MS to hand the call into a new cell. In routing the call through a nearby cell, the BSC knows to which network the cell belongs, but not to which network the MS/subscriber belongs. In the example shown in FIG. 1, the call is handed into cell 24, operated by the partner network, based on slightly higher signal strength than cell 22. Path 28 indicates the succession of cells handling the call from MS 2, as it travels along path 3. When MS 2 emerges into home region 20, rather than having the call routed through the home network cell 22, it remains routed through partner network cell 24. MS 2 then arrives at a location 26, where the call continues until termination. Although the signal strength of cell 22 may be more than sufficient to carry the call, the partner network continues to carry the call for its duration. This results in a loss of potential revenue to the home network operator for the duration of the call that takes place while the subscriber has entered the home region 20, but is routed through the partner network. Thus, the lack of means to direct a call handled by a partner back into a home network may result in significant lost revenue for an operator.

When viewed from the perspective of the partner network, the aforementioned scenario presents additional problems. Because of the inability to handover all calls associated with home network subscribers back to a cell in the home network, when any MS from the home network, whose call is being routed through the partner network, enters region 20, the resources of the partner network are unduly burdened with handling such calls that "should" be handed to the home network. This may result in inconvenience to, or lost revenue from, partner network subscribers who attempt to place calls in the region 20.

While the above example was directed towards illustrating problems existing with handover of voice communications between networks, similar problems can occur for data transmission to and from a mobile station. Using general packet radio service (GPRS), data is transmitted to or from a mobile device connected to a GSM service provider. When an MS belonging to a subscriber is in a partner region and approaches the border between a partner region and home region during a GPRS message, handoff to the home network is desired.

It is thus clear that there is a need to establish a system and method for communication between different mobile networks, where a call handled by a partner network can be handed back to the home network, as opposed to any other available network, when an MS enters a home region.

BRIEF SUMMARY OF THE INVENTION

The present invention provides systems and methods for routing mobile communications during travel of a MS from a partner network region to a home region. In a first embodiment, a method is disclosed in which a handover from a partner network to a subscriber's home network is accomplished by the partner network's setting of a flag indicating that a call belongs to a subscriber to a home network, when it first handles the subscriber's call. The flag may be a number, code or any other information that designates the subscriber as being associated with a particular network provider. When the MS of the subscriber approaches the home region, the partner network is signaled by the previously set flag to initiate a handover of the customer's call back to the home network. This functionality is also referred to as "differential handover".

In another embodiment of the present invention, a method is disclosed in which a differential handover from a partner network to a home network is accomplished by the sharing of network specific data between the home network and partner network, such as broadcast control channel (BCCH) frequency and base station (cell) identity codes (BSIC), in addition to setting of a flag denoting a home network subscriber when a call is first handled. When the partner network is signaled by the previously set flag to initiate a differential handover, the known frequency and cell parameters belonging to the home network can assist in directing the handover.

In a further embodiment, a method is disclosed in which a differential handover of a GPRS message from a partner network to a subscriber's home network is accomplished by setting a flag in a message received by the serving GPRS support node (SGSN) of the partner network, when it first handles a subscriber's message. The flag may be set based on a subscriber's international mobile station identity (IMSI), for instance. When the MS of the subscriber approaches the home region, the partner network is signaled by the previously entered flag to initiate a differential handover of the GPRS message to the home network.

BRIEF DESCRIPTION OF THE DRAWINGS

FIG. 4 illustrates exemplary steps of a differential call handover according to an alternative embodiment of the present invention.

DETAILED DESCRIPTION OF THE INVENTION

Figure 1:
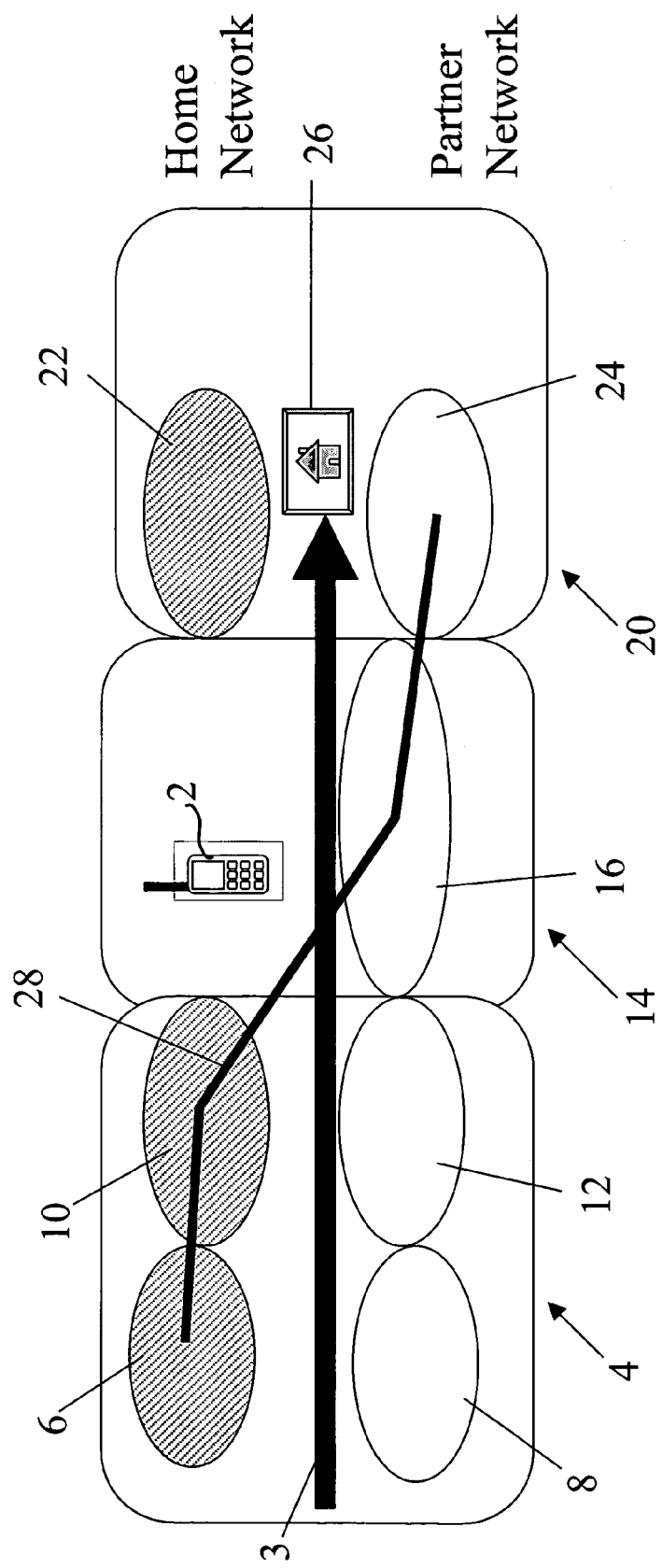
FIG. 1 is a schematic diagram of call handling for a traveling mobile station.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

A preferred embodiment of the present invention comprises a method for differential handover of a call from a partner network to a home network, when, during travel, a mobile station moves between a region operated by the partner and a region in which both the partner network and home network operate. In particular, the handover from the partner network to the home network occurs when the MS subscriber is a customer of the home network. In order to ensure that the call is routed to the home network, a flag identifying the call as associated with the home network is set by an MSC of the partner network, in the partner networks BSC, when the call is first routed through the partner network. This could occur when a call is first initiated in partner region, or when an MS enters a partner region during an ongoing call.

Figure 2:
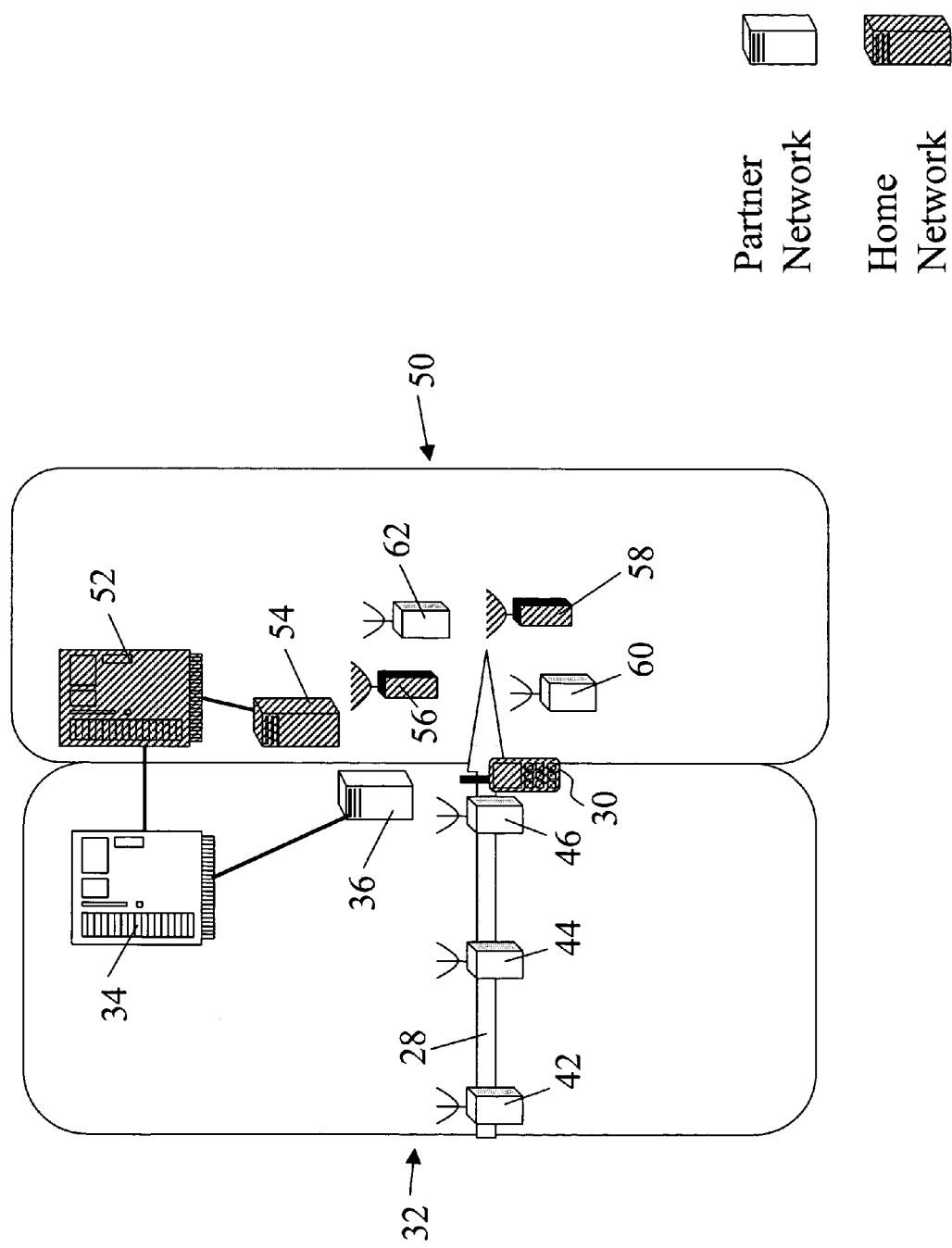
FIG. 2 illustrates an embodiment of the present invention, in which differential call handover between networks occurs.

Referring to FIG. 2, when a mobile station 30 travels through partner region 32, a call terminating at MS 30 is routed through MSC 34, and BSC 36 belonging to the partner network. As MS 30 moves along path 28 through cells 42, 44, and 46, associated with the partner network in partner region 32, handover is accomplished by means well known to skilled practitioners. According to a preferred embodiment of the present invention, when MS 30 approaches the home region 50, differential handoff of the call into cell 56 associated with the home network is performed, as opposed to a handoff into nearby cell 60 in the partner network, which also happens to operate in the same region.

Figure 3:
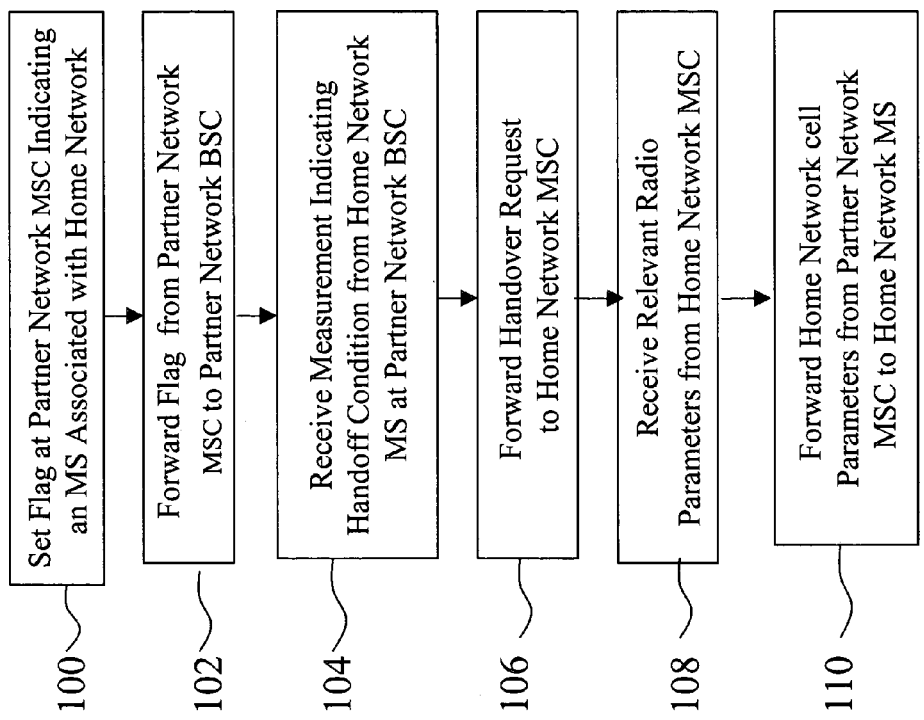
FIG. 3 illustrates exemplary steps of a differential call handover according to an embodiment of the present invention.

FIG. 3 illustrates details of steps involved in the differential handoff of a call according to a preferred embodiment of the present invention. In step 100, MSC 34 in the partner network sets a flag that indicates MS 30 in region 32 is associated with the home network. The flag setting preferably occurs when MS 30 is in region 32 and initiates a call. Alternatively, the flag may be set when a call routed to MS 30 through the home network is handed over to the partner network, when MS 30 enters partner region 32. In step 102, MSC 34 then forwards the flag information to BSC 36 in the partner network. In a preferred embodiment, the flag information is inserted in a channel assignment message sent from MSC 34 to BSC 36 which allocates the frequencies for the call routed to MS 30. The information contained in the flag will include an identifier such as the value "4", agreed upon by both networks, that is indicative of the subscriber's home network.

In step 104, MS 30 approaches the edge of region 32 near the boundary of cell 46 (see FIG. 2), and a measurement report for cell 46 is sent to BSC 36, indicating that a handoff to a new cell needs to be initiated. Since the call is flagged as being associated with the home network, in step 106 BSC 36 initiates a handover request to MSC 34 which forwards the handover request with flag "4" to MSC 52 of the home network. MSC 52 then determines that the handover should be to cell 56. In step 108 the MSC 52 forwards the required radio parameters associated with cell 56 to MSC 34. In step 110 MSC 34 forwards the cell parameters to MS 30, and handover from cell 46 to 56 is initiated.

Figure 5A:
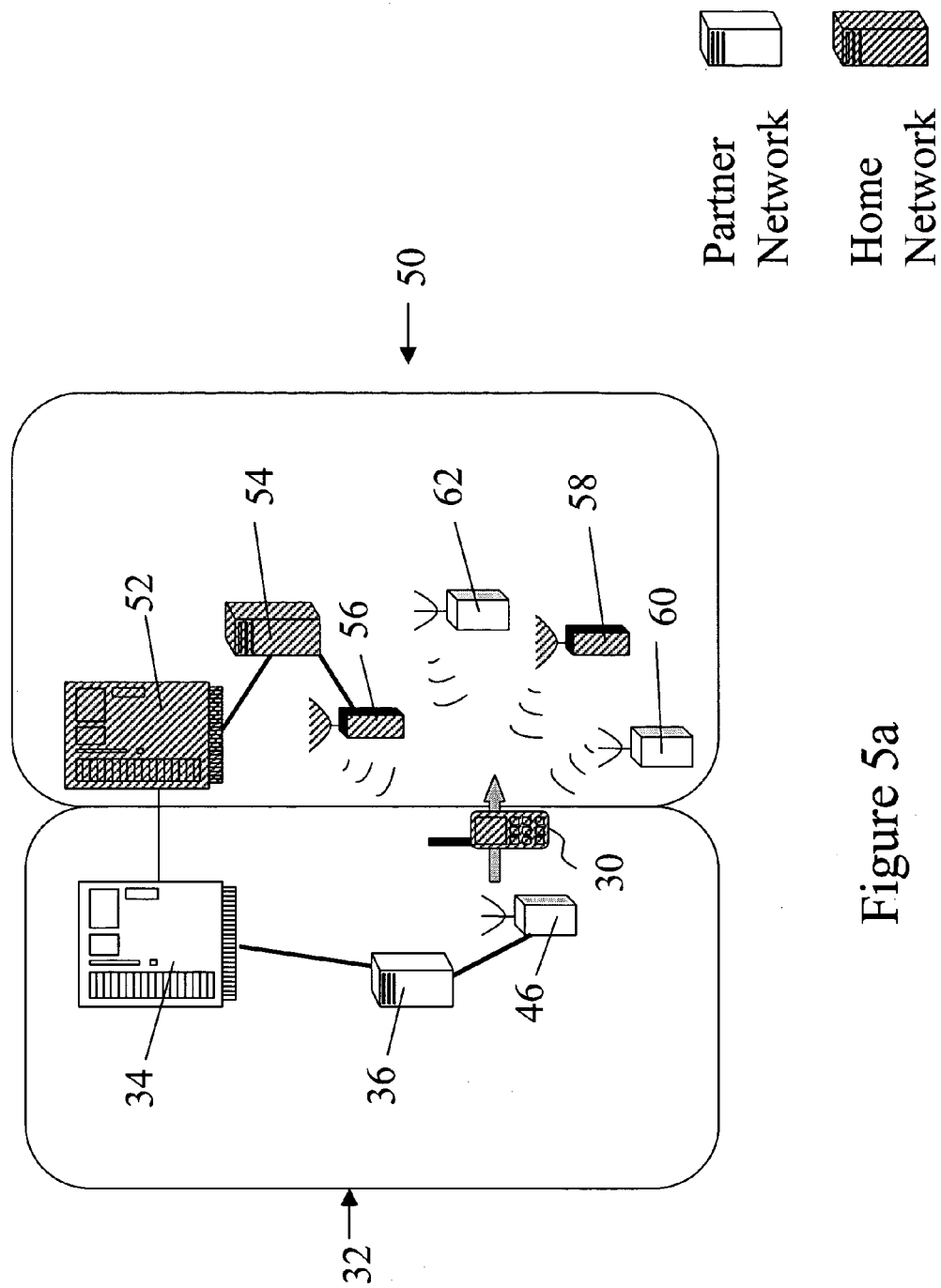
FIGS. 5a and 5b illustrate differential call handover according to a further embodiment of the present invention.
Figure 5B:
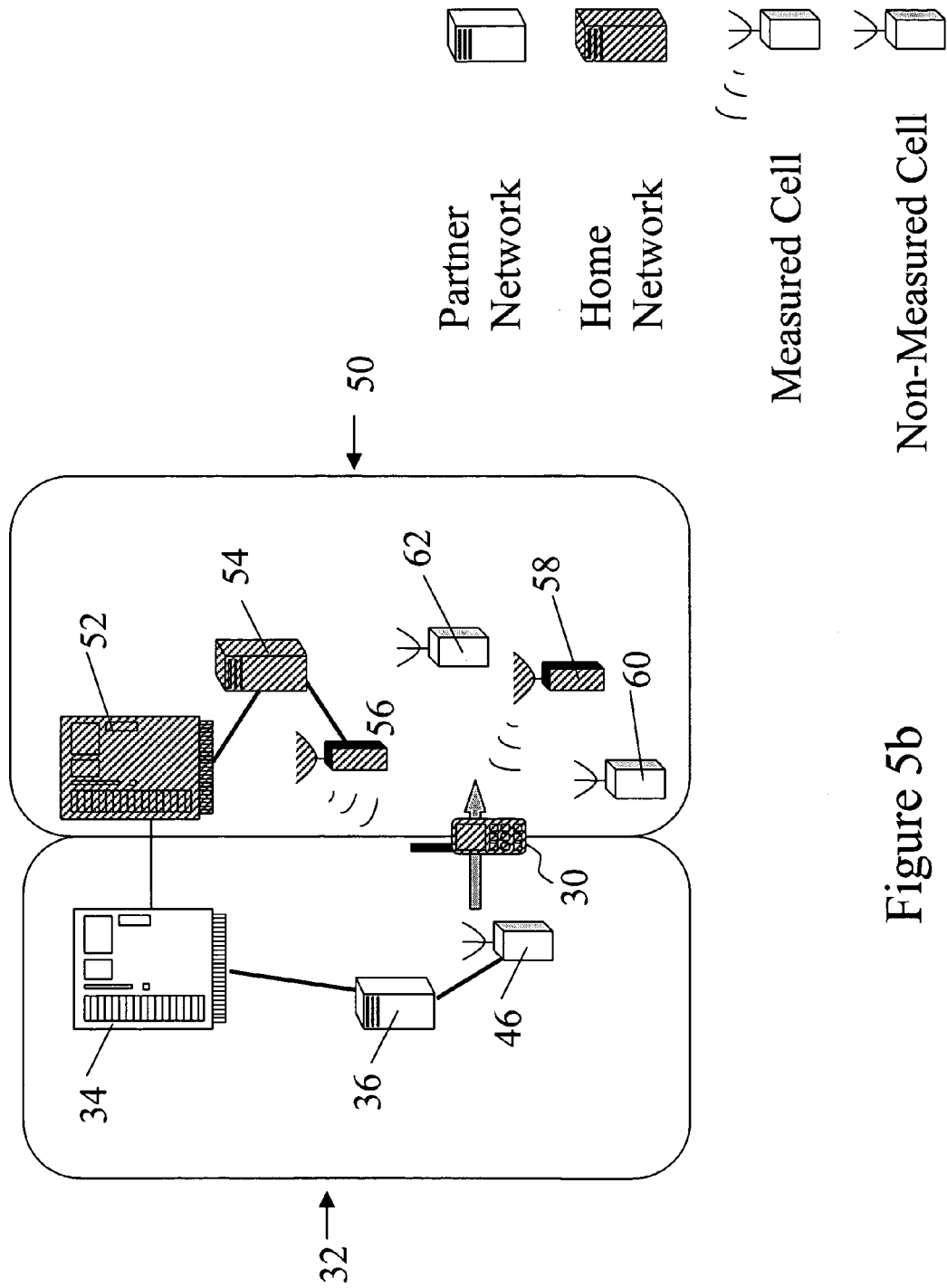

In addition to a flag indicating that MS 30 belongs to the home network, differential call handover may be aided by sharing of control channel and system parameters between networks. FIG. 4 illustrates details of steps involved in the differential handoff of a call according to a further embodiment of the present invention. Initial steps 100 and 102 are implemented as described above. In step 112, the MS reports measurements of the BCCH frequency for cell 56. Since MS 30 is flagged, a handover request is subsequently initiated to MSC 52, through MSC 34 as indicated above, and described in more detail below. In a preferred embodiment, MSC 34 is provided with information stored in a database belonging to the partner network, including data associated with cells 56 and 58, bordering on region 32, illustrated in FIG. 5a. When MS 30 approaches the edge of region 32 near the boundary of cell 46, it receives and reports signal strength for nearby cells 56, 58, 60 and 62, as well as a report for cell 46. This information is forwarded to MSC 34, which ascertains, based on the report for cell 46, that a handoff to a new cell needs to be initiated, shown as step 116. Since the call is flagged as being associated with the home network, MSC 34 retrieves previously stored cell information corresponding to the flagged home network, and in step 118, sends a message to BSC 36 indicating the relevant channels associated with the home network. In step 120, the BSC 36 continues to monitor measurement reports sent by MS 30 as it travels toward home region 50. The signal strength of cells reporting over the flagged home network channels are monitored to help identify a handover cell candidate. At step 122, cells not associated with the home network are excluded as potential handover candidates. Thus, cells 60 and 62 are removed from the list of cells reporting further measurements and no longer are effectively detected by MS 30, as shown in FIG. 5b. If a cell is associated with the home network, e.g., cells 56 and 58 in home region 50, then in step 124, BSC 36 may send a handover request message to MSC 34, indicating the channel/frequency parameters assigned to either of cells 56 or 58. In step 126, MSC 34 forwards the information received in a handover request message to MSC 50 in the home network. In step 128, MSC 54 returns network resource information to MSC 34 to prepare for handover. In step 130, MSC 34 directs MS 30 through BSC 36 to switch to the appropriate frequency controlled by cell 56, and the call becomes routed through cell 56 of the home network.

Figure 6A:
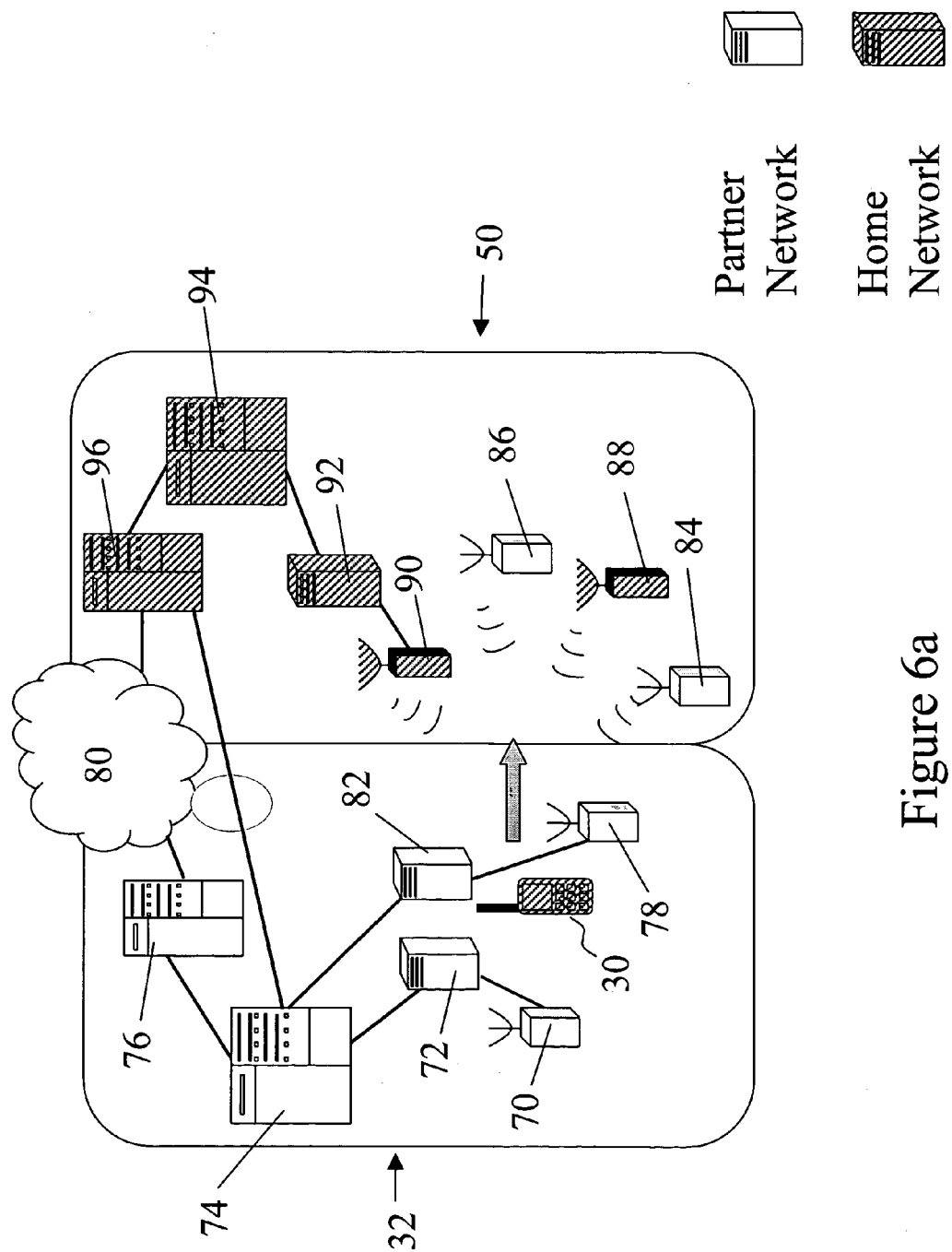
FIGS. 6a and 6b illustrate differential GPRS handover according to a still further embodiment of the present invention.
Figure 6B:
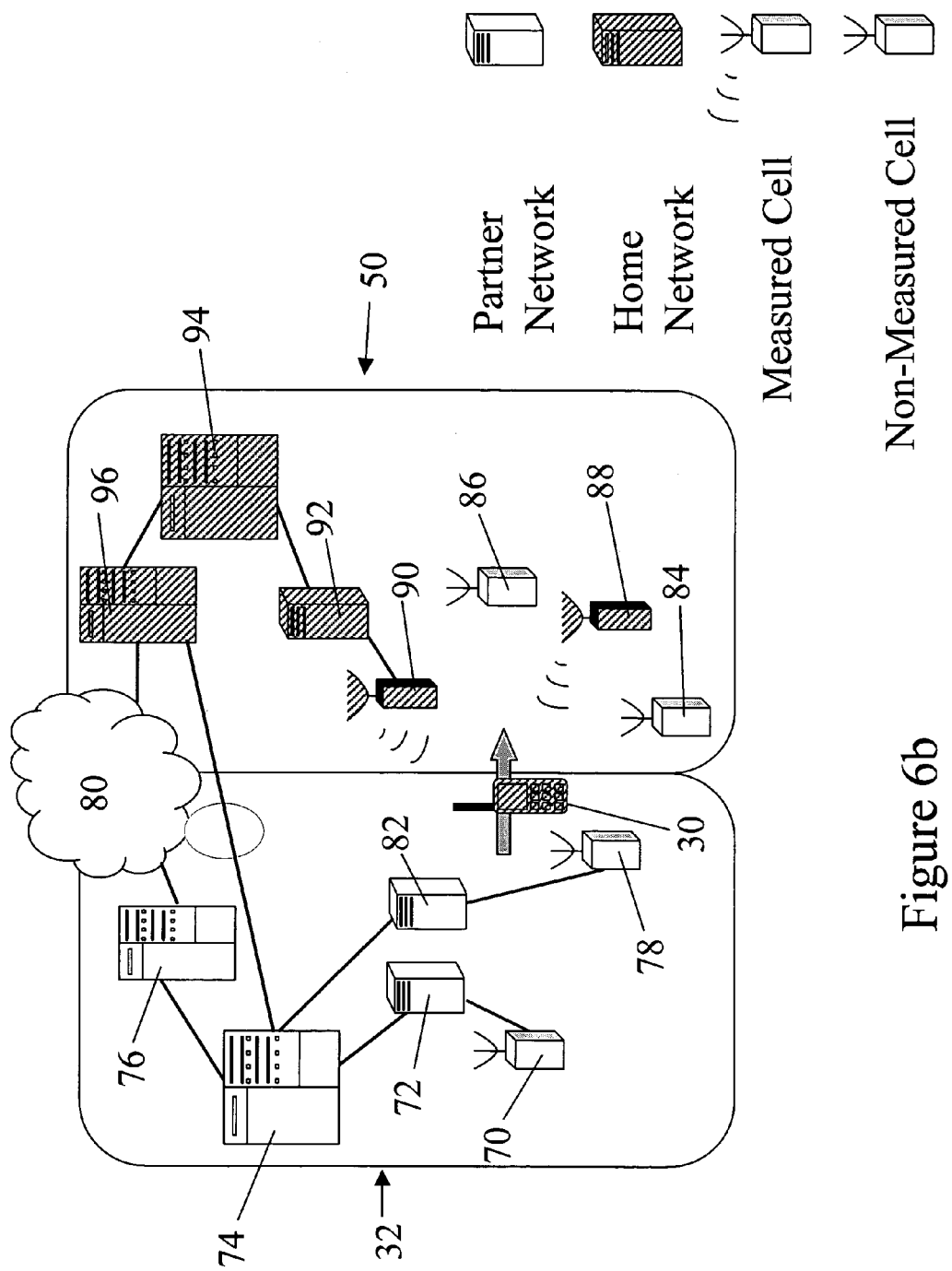
Figure 7A:
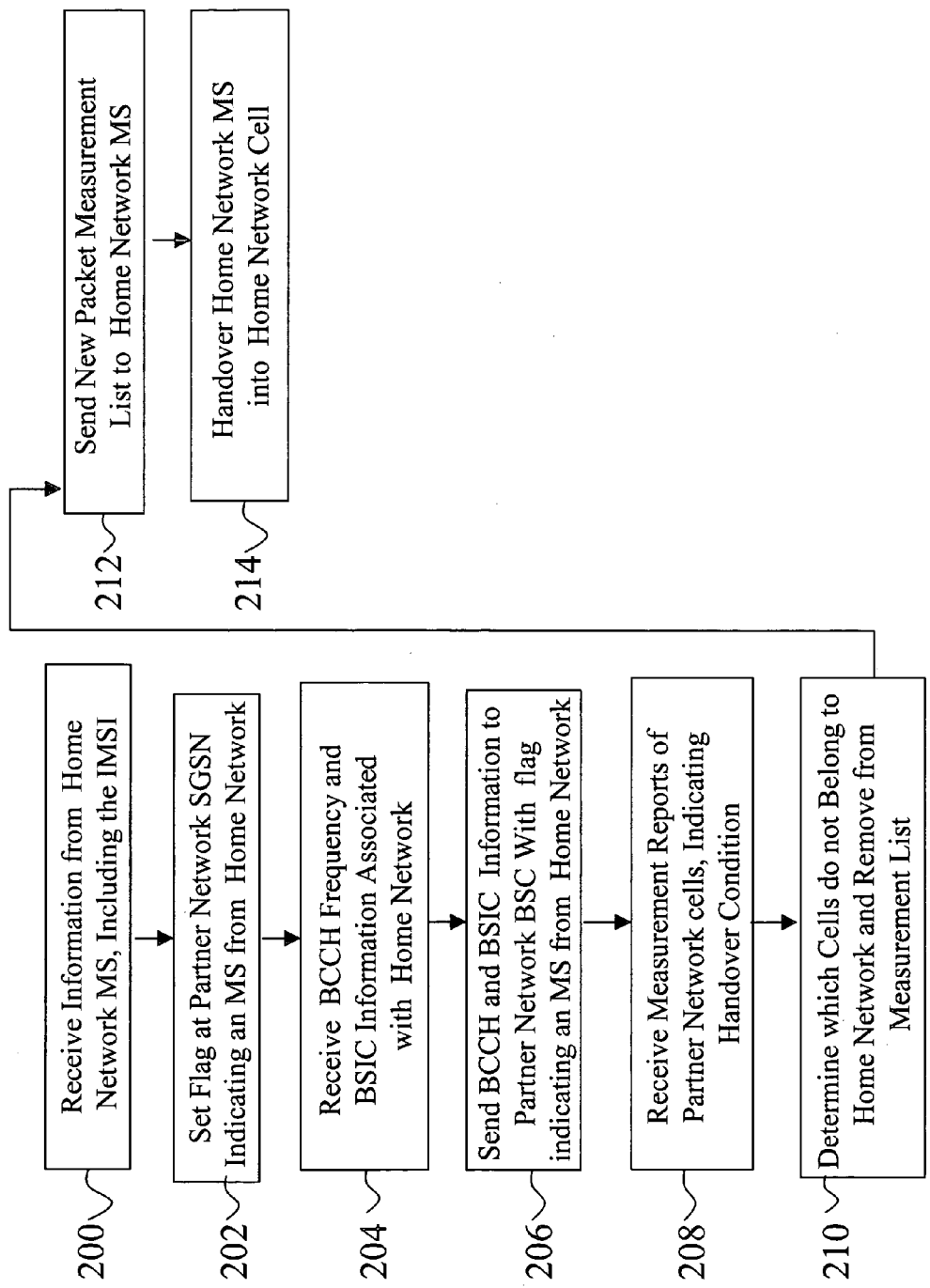
FIG. 7a illustrates exemplary steps of a differential GPRS handover according to a further alternative embodiment of the present invention.
Figure 7B:
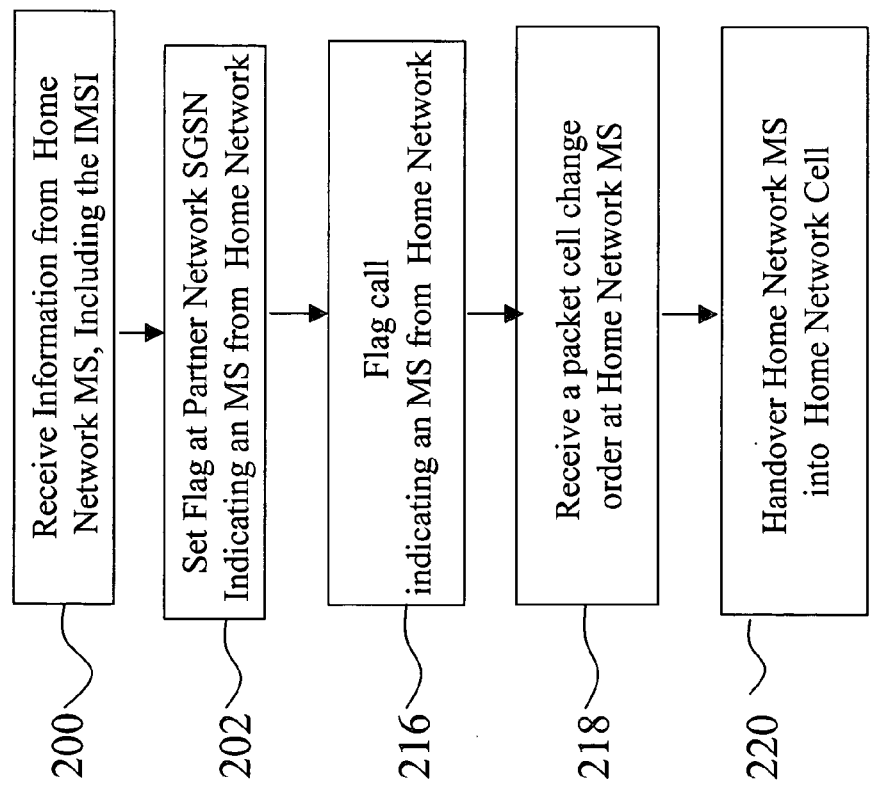
FIG. 7b illustrates exemplary steps of a differential GPRS handover according to another alternative embodiment of the present invention.

Embodiments of the current invention also include differential handover of GPRS transmissions. In FIG. 6a, MS 30, a subscriber to the home network, resides in partner region 32 operated by the partner network. GPRS data transmission to and from MS 30 is conducted through cell 70 linked to BSC 72, which, in turn, is connected to serving GPRS support node (SGSN) 74. Data traveling to and from the partner network, is linked to public data network 80, e.g., the internet, through gateway GPRS support node (GGSN) 76. FIG. 7a outlines exemplary steps for differential handoff of a GPRS message from the partner network to the home network according to a preferred embodiment of the present invention. In step 200, SGSN 74 receives information from MS 30, including the international mobile system identity (IMSI). This information is forwarded to BSC 72, which sets a flag designating MS 30 as belonging to the home network, in step 202. In step 204, the home network also provides the partner network with BCCH frequency and BSIC information associated with the home network. This information is provided to the partner network in advance of the partner network handling a data exchange to or from MS 30. As MS 30 travels toward home region 50 while transmitting and receiving GPRS data, the transmission is handed off to cell 78 in the partner network. In step 206, SGSN 74 sends data to BSC 82, which controls cell 78, the data including the IMSI for MS 30, with the flag identifying it as belonging to the home network. In step 208, as illustrated in FIG. 6b, MS 30 approaches the border between partner region 32 and home region 50, and reports a signal strength of nearby cells. In step 210, MS 30 receives BCCH information related to home network cells 88 and 90. In step 212 MS 30 measures on cells 90 and changes over to cell 90 of the home network in step 214. Alternativley, as illustrated in FIG. 7b, handover to a home network may be effected without sharing of BCCH information with the partner network. After the partner network receives IMSI information from MS 30 and sets a flag in step 202, an incoming call to MS 30 is flagged as belonging to the home network at step 216. In step 218, MS 30 approaches the border region between cells 78 and 90, and BSC 82 transmits a packet cell change order to MS 30 indicating that it should look for home network cells for handover. In step 320 MS 30 hands into cell 90 of the home network.

Figure 8:
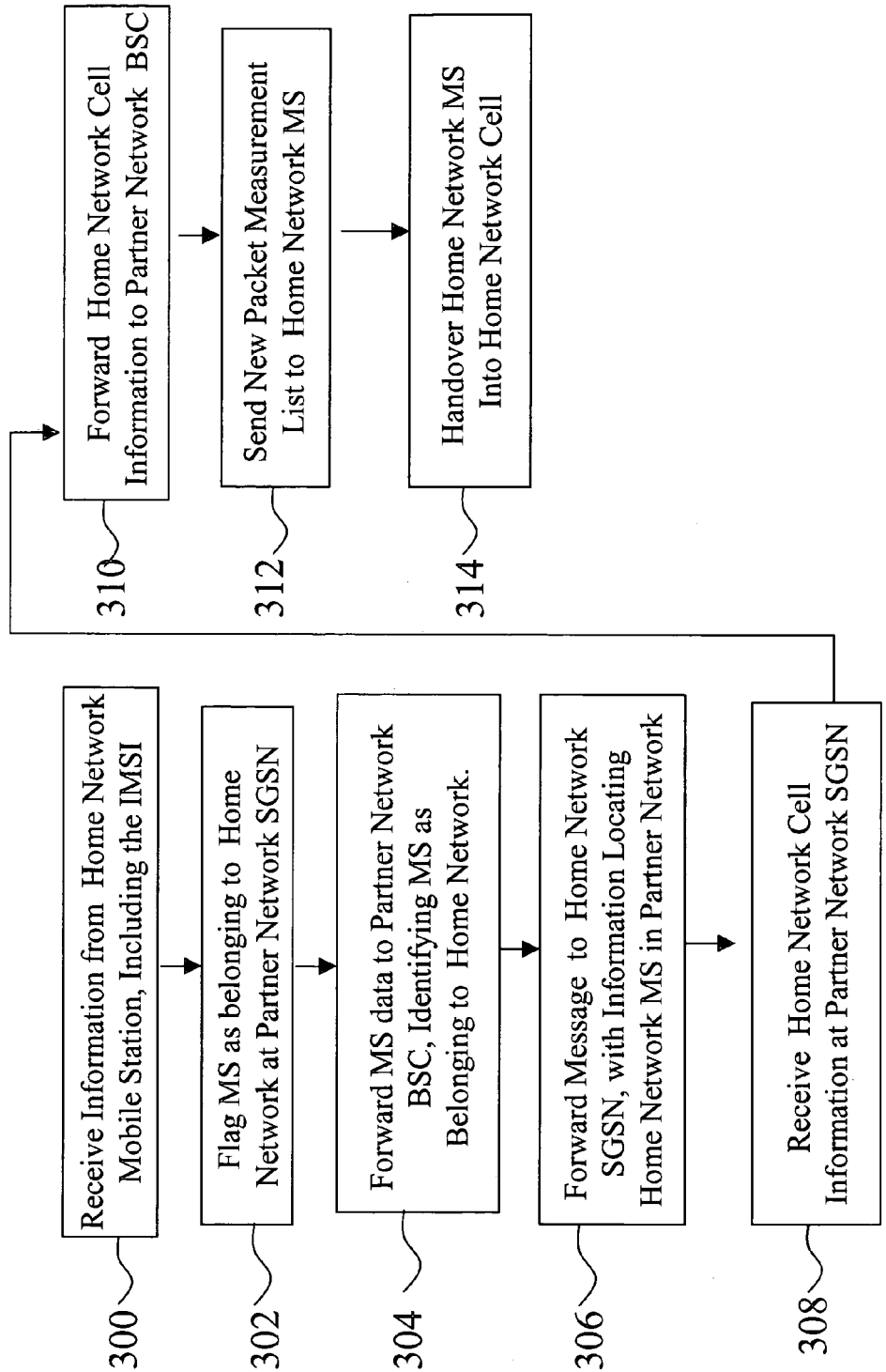
FIG. 8 illustrates exemplary steps of a differential GPRS handover according to a still further alternative embodiment of the present invention.

FIG. 8 illustrates exemplary steps for differential handoff of a GPRS message from the partner network to the home network according to another embodiment of the present invention. In the embodiment disclosed in FIG. 8, no specific network information is shared between the home and partner networks, in advance of the time in which differential handoff is to take place. In step 300, BSC 72 receives information from MS 30, which has entered partner region 32 during a call, or has received or initiated a call while residing therein. This information includes the international mobile station identity (IMSI), which is forwarded to SGSN 74, which flags the call as belonging to a subscriber to the home network in step 302. As MS 30 travels toward home region 50 while transmitting and receiving GPRS data, the transmission is handed off to cell 78 in the partner network. In step 304, BSC 82 which controls cell 78, receives data from SGSN 74, including the IMSI for MS 30, identifying it as belonging to the home network. In step 306, BSC 82 sends a message to SGSN 94 of the home network, indicating the presence of MS 30 in the partner network, with an agreed upon indicator specifying cell 78. The home network then checks its list of cells in the neighborhood of cell 78, and in step 308, forwards a message through GGSN 96, PDN 80, and GGSN 76, to SGSN 74, including information regarding home network cells 88 and 90, both bordering cell 78. In step 310, SGSN 74 forwards the information to BSC 82, which, in step 312, then delivers a new packet measurement order to remove partner network cells 84 and 86 from the MS 30 measurement list, and replaces them with home network cells 88 and 90. If MS 30 continues to travel in the direction of home region 50, then as shown in step 314, MS 30 hands over into cell 90 of the home network.

Figure 9:
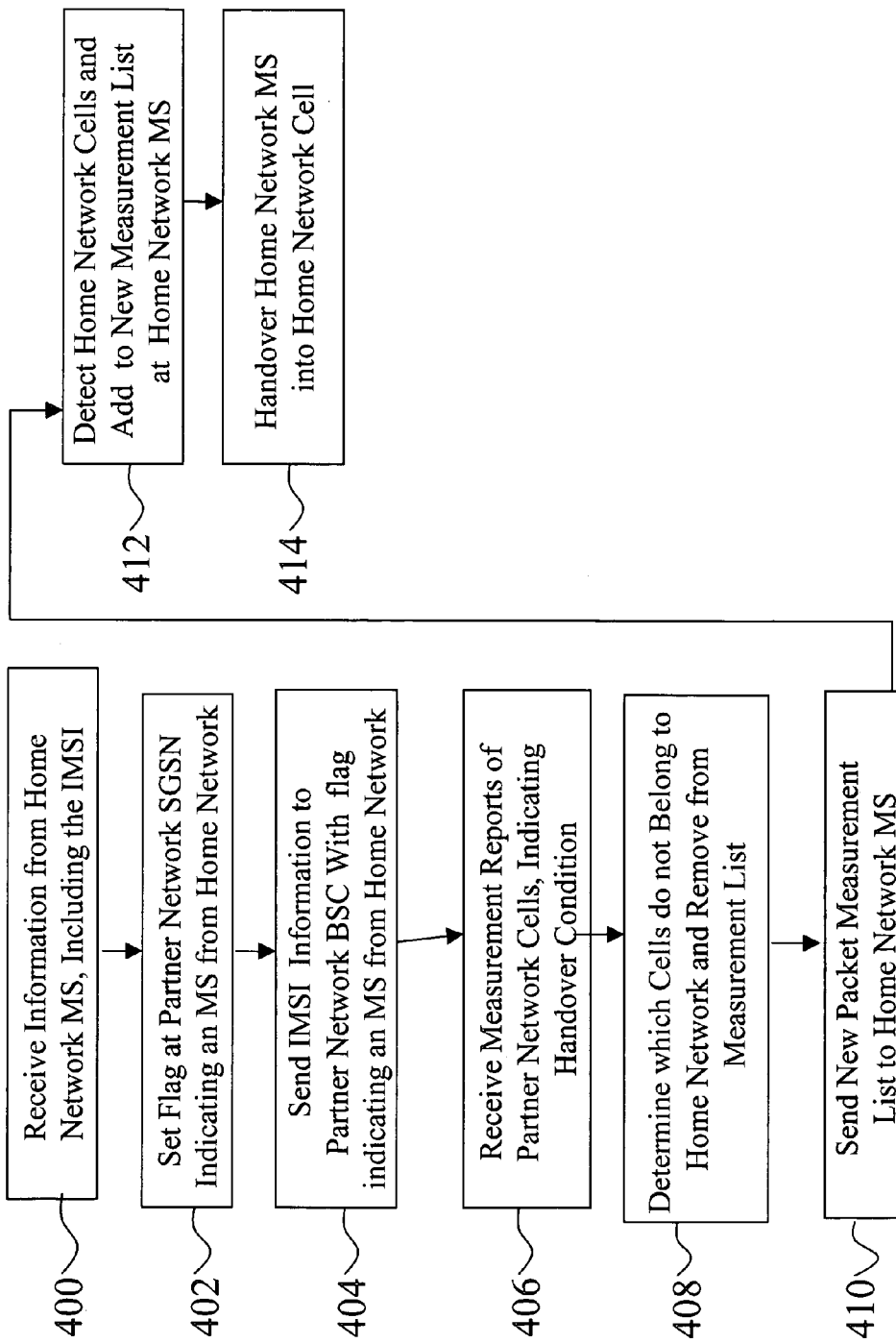
FIG. 9 illustrates exemplary steps of a differential GPRS handover according to a still another alternative embodiment of the present invention.

FIG. 9 outlines another embodiment of the present invention. In step 400, BSC 72 receives information from MS 30, including the international mobile system identity (IMSI). This information is forwarded to SGSN 74, which sets a flag designating MS 30 as belonging to the home network, in step 402. Referring again to FIG. 6a, when MS 30 enters cell 78 in the partner network, in step 404, SGSN 74 sends data including the IMSI for MS 30 to BSC 82, which alerts the BSC to the fact that MS 30 belongs to the home network. In step 406, as illustrated in FIG. 6b, MS 30 approaches the border between partner region 32 and home region 50, and forwards measurements from the partner network cells 84 and 86 to BSC 82. From the signal strength measurements, BSC 82 determines that a handover condition exists for MS 30, which is flagged as a subscriber to the home network. In step 408, BSC 82 determines which reporting cells on the measurement list of MS 30 do not belong to the home network, and in step 410, BSC 82 delivers a packet measurement order which removes partner network cells 84 and 86 from the MS 30 measurement list. In step 412, MS 30 detects cells 88 and 90 and adds them to an updated measurement list. If MS 30 continues to travel in the direction of home region 50, in step 414 it hands over into cell 90 of the home network, based, for instance, on superior signal strength or better availability, with respect to nearby home network cell 88.

Thus, according to the above disclosed embodiments, calls to home mobile network subscribers entering a home region from a partner region, are more likely to be handed over to the home network, rather than continue to be routed through the partner mobile network. It follows then that the home mobile network is able to recover more revenue from subscribers whose calls might otherwise have continued to be charged by the partner network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for selecting a cell for handover of a continuing communication, wherein the communication is initially routed through a first cell of a partner mobile network, comprising:
    establishing a flag for use by a partner mobile network and a home mobile network, the flag indicating that a mobile station belongs to a subscriber to the home mobile network;
    storing information including the flag in a database that is in communication with the partner mobile network;
    setting a flag with respect to a communication involving the mobile station that is being carried on a partner mobile network as including a mobile station of a subscriber of a home mobile network;
    determining that a handover from a first cell in the partner mobile network to a second cell among a plurality of candidate cells, is necessary to maintain communications for the mobile station; and
    initiating a handover of the communication from the first cell to the second cell if the second cell belongs to the home mobile network, wherein whether the second cell belongs to the home mobile network is determined, at least in part, by evaluating whether the flag is set.

2. The method of claim 1, wherein, prior to the handover, radio parameters associated with the second cell belonging to the home mobile network are received by the partner mobile network.

3. The method of claim 1, wherein each of the partner and the home mobile networks operates its own mobile switching center.

4. The method of claim 1, wherein, prior to the communication handover, the partner mobile network receives information including control channel and system parameters associated with the home mobile network.

5. The method of claim 4, further comprising;
    sending a handover request from the base station controller of the partner mobile network, the request including parameters associated with the second cell;
    receiving resource information from the home network at the base station controller of the partner network, the resource information including information associated with the second cell; and
    sending information from the partner network at the mobile station of the subscriber to the home network, including an appropriate communications channel associated with the second cell.

6. The method of claim 4, wherein the control channel and system parameters associated with the home network are stored in a database accessible to the mobile switching center of the partner network.

7. The method of claim 4, wherein the communication is a voice transmission.

8. The method of claim 4, further comprising: receiving a communication at a base station controller of the partner mobile network that controls the first cell, including at least one home mobile network channel.

9. The method of claim 8, further comprising:
    monitoring measurement reports sent by the mobile station belonging to the subscriber of the home mobile network, including a signal strength of the second cell controlling the at least one home mobile network channel, at the base station controller of the partner mobile network that controls the first cell; and
    excluding cells not reporting over the at least one home mobile network channel from further measurements.

10. The method of claim 4, wherein the communication is a GPRS message.

11. The method of claim 10, further comprising:
    removing cells not belonging to the home network from a measurement list associated with the mobile station of the subscriber to the home network; and
    sending a measurement list to the mobile station of the subscriber to the home network, wherein the measurement list includes the second cell.

12. A method for increasing revenues of a home mobile communications network, comprising:
    establishing a flag for use by a partner mobile network and a home mobile network, the flag indicating that a mobile station belongs to a subscriber to the home mobile network;
    storing information including the flag in a database that is in communication with the partner mobile network;

setting the flag when the partner mobile network handles a communication to a mobile station belonging to a subscriber to the home mobile network; and handing over the communication back to the home mobile network whenever the mobile station enters a region in which the home network operates, the handover being effected due to the flag being set, whereby revenues are increased to the home mobile network by handling the communication through the home mobile network whenever the mobile station is in a region in which the home mobile network operates.

* * * * *